(No Model.)

A. A. ABBOTT.
VEHICLE SPRING.

No. 255,403. Patented Mar. 28, 1882.

Witnesses.
Henry Frankfurter,
W. S. Morse

Inventor.
Arthur A. Abbott.
per. Gridley & Co.
his. Attorney

UNITED STATES PATENT OFFICE.

ARTHUR A. ABBOTT, OF CHICAGO, ILLINOIS.

VEHICLE-SPRING.

SPECIFICATION forming part of Letters Patent No. 255,403, dated March 28, 1882.

Application filed January 3, 1882. (No model.)

*To all whom it may concern:*

Be it known that I, ARTHUR A. ABBOTT, a citizen of the United States of America, residing at Chicago, in the county of Cook and State of Illinois, have invented certain new and useful Improvements in Spring-Vehicles, of which the following, in connection with the accompanying drawings, is a full, clear, and exact description.

Figure 1:
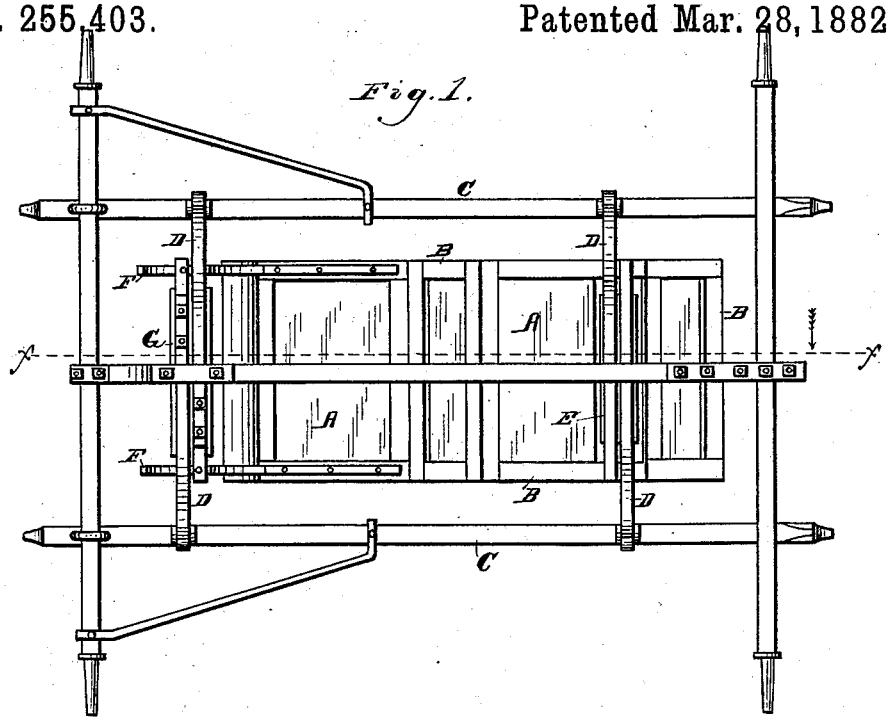
Figure 2:
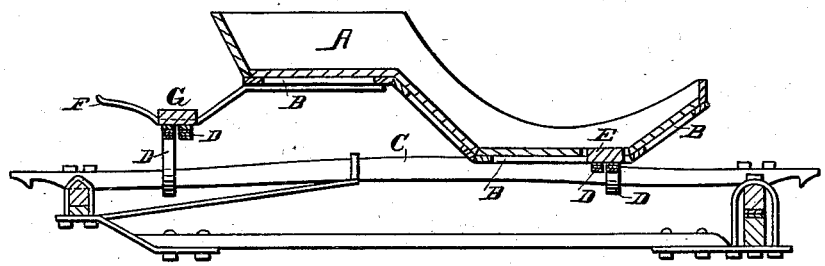
Figure 3:
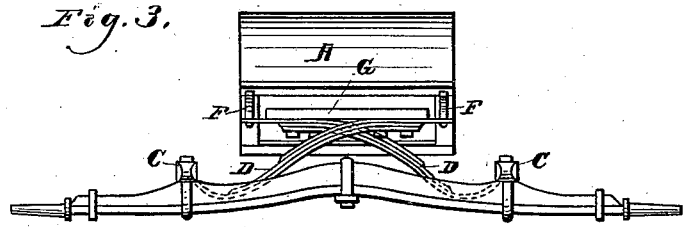

In the drawings, Figure 1 is a bottom view of a vehicle embodying my invention. Fig. 2 is a section in the plane of the line $ff$ of Fig. 1, viewed in the direction indicated by the arrow there shown; and Fig. 3 is a rear view of the vehicle.

Like letters of reference indicate like parts.

My invention consists in the means, substantially as hereinafter set forth, which I employ for the purpose of connecting the body of a wheeled vehicle yieldingly to a side-bar gearing.

A represents a phaeton-shaped body of suitable form or design. B B are the sills of the body. C C are the side bars.

D D are springs, which may be termed "quarter-elliptic" springs, as they are somewhat shorter than half-elliptic springs, and have not a full half-arch. I employ a pair of these springs near the forward part of the vehicle, and also at the rear thereof, as represented.

Both springs in the forward pair are connected at their outer ends to the side bars, respectively, and extend thence in opposite directions or transversely with relation to the body, and, arching under the sills nearest these ends, are secured at their inner ends to the other sills, respectively, one spring being arranged just forward of the other, as shown, so that neither can interfere with the action of the other.

E is a block or bar wholly independent of the body A and firmly secured to the inner ends or parts of the springs in the forward pair, for the purpose of steadying their action.

F F are brackets extending rearward from the body, and G is a transverse bar between the said brackets. Both springs in the rear pair are connected at their outer ends to the side bars, respectively, and at their inner ends or portions to the brackets and to bar G. In other respects the rear springs are arranged substantially the same as the forward pair.

The other parts of the vehicle may be constructed in any well-known way suitable for vehicles of this class.

It will be perceived that the body may be applied yieldingly and with facility to the side gear in the manner shown and described, and that the springs, while being very sensitive or yielding, will hold the body firmly in its proper place.

Having thus described my invention, what I claim as new, and desire to secure by Letters Patent, is—

A phaeton-shaped body supported in front by springs D D, steadied by the independent transverse bar E, and at the rear by the brackets F, transverse bar G, and springs D D, attached to said bar G and to the side bars, C C, all constructed and arranged as described and shown.

ARTHUR A. ABBOTT.

Witnesses:
JOHN H. AVERY,
N. COWLES.